US007997245B2

(12) United States Patent
Tokugawa et al.

(10) Patent No.: US 7,997,245 B2
(45) Date of Patent: Aug. 16, 2011

(54) FUEL INJECTION CONTROL APPARATUS

(75) Inventors: Kazuhito Tokugawa, Tochigi-ken (JP); Shinichi Ishikawa, Tochigi-ken (JP)

(73) Assignee: Keihin Corporation (JP)

( * ) Notice: Subject to any disclaimer, the term of this patent is extended or adjusted under 35 U.S.C. 154(b) by 427 days.

(21) Appl. No.: 12/200,740

(22) Filed: Aug. 28, 2008

(65) Prior Publication Data

US 2009/0063015 A1 Mar. 5, 2009

(30) Foreign Application Priority Data

Aug. 29, 2007 (JP) ................................ 2007-223191

(51) Int. Cl.
*F02D 41/06* (2006.01)
*G01M 15/00* (2006.01)

(52) U.S. Cl. ................ 123/179.18; 701/113; 73/114.27; 73/114.33

(58) Field of Classification Search ............. 123/179.16, 123/179.17, 179.18, 406.18, 406.22; 73/114.26, 73/114.27, 114.28, 114.33; 701/103, 105, 701/113

See application file for complete search history.

(56) References Cited

U.S. PATENT DOCUMENTS

| | | | | |
|---|---|---|---|---|
| 6,484,694 | B2 * | 11/2002 | Thomas | 123/435 |
| 6,499,341 | B1 * | 12/2002 | Lodise et al. | 73/114.28 |
| 6,588,259 | B2 * | 7/2003 | Lodise et al. | 73/114.27 |
| 6,874,473 | B2 * | 4/2005 | Carpenter | 123/406.18 |
| 6,935,168 | B2 * | 8/2005 | Shimoyama | 73/114.28 |
| 2005/0212509 | A1 * | 9/2005 | Asama | 324/207.2 |
| 2009/0126685 | A1 * | 5/2009 | Asada et al. | 123/406.19 |

FOREIGN PATENT DOCUMENTS

| | | |
|---|---|---|
| JP | 2003003887 | 1/2003 |
| JP | 2004162543 | 6/2004 |
| JP | 2004162691 | 6/2004 |

* cited by examiner

*Primary Examiner* — Thomas N Moulis
(74) *Attorney, Agent, or Firm* — Cantor Colburn LLP

(57) ABSTRACT

A fuel injection control apparatus includes: an internal combustion engine; a fuel injection unit provided in the internal combustion engine; an intake state detection unit that detects an intake state value indicating an intake state of the internal combustion engine, and that outputs an intake state signal; and a control unit to which the intake state signal is input, that determines based on the intake state signal whether or not the internal combustion engine is on an intake stroke, and that controls the fuel injection unit so that an initial fuel injection is performed in order to start up the engine when the control unit determines that the engine is on an intake stroke.

8 Claims, 11 Drawing Sheets

FUEL INJECTION CONTROL APPARATUS

BACKGROUND OF THE INVENTION

This application is based on and claims priority from Japanese Patent Application No. 2007-223191, filed on Aug. 29, 2007, the contents of which are incorporated herein by reference.

1. Field of the Invention

The present invention relates to a fuel injection control apparatus, and, in particular, to a fuel injection control apparatus that is used to control a fuel injection unit such as an injector that is provided in a four-stroke engine serving as an internal combustion engine.

2. Description of Related Art

Conventionally, techniques are known that perform fuel injection during startup based on crank sensor signals, generator output voltage, and engine speed as the conditions for performing the initial fuel injection when starting (i.e., cranking) an internal combustion engine. These techniques are disclosed in (1) to (3) (see below).

(1) A technique is disclosed in Japanese Unexamined Patent Application, First Publication No. 2003-3887 in which startup fuel injection is performed in accordance with a single pulse signal while the crank is being rotated, voltage change characteristics are then determined, and thereafter fuel injection is performed based on the results of this determination.

(2) A technique is disclosed in Japanese Unexamined Patent Application, First Publication No. 2004-162691 in which, after an engine startup operation has begun, the initial fuel injection is performed when the output voltage from the generator reaches a set value.

(3) A technique is disclosed in Japanese Unexamined Patent Application, First Publication No. 2004-162543 in which fuel injection is performed when the crank angle velocity at the intake top dead center reaches a reference angular velocity after cranking has commenced.

Among internal combustion engines that are started by manual cranking, in a case of displacement volume and high compression ratio internal combustion engine, some types of internal combustion engines exist that are only able to be cranked approximately three revolutions in a single startup operation.

In these types of engine, in order to ensure superior startability by obtaining a predetermined engine speed at the compression top dead center where ignition takes place, it is common for an operation to discover the startup commencement crank angle to be performed.

There is a problem in that, fuel injection is performed during this operation to detect the startup commencement crank angle, excessive fuel is taken into the intake pipe and combustion chamber, and, as a results, startability during the actual startup operation is deteriorated.

In the technique disclosed in Japanese Unexamined Patent Application, First Publication No. 2003-3887, because fuel injection is performed based on the crank sensor signal that is output each time the crank makes one rotation, the fuel injection during startup is not performed based on the engine stroke which results in excessive fuel being injected.

Although the technique disclosed in Japanese Unexamined Patent Application, First Publication No. 2004-162691 performs an initial fuel injection determination in a batteryless system, there is no correlation between the generator output voltage and the engine stroke. There is a possibility that excessive fuel will be injected during an operation to detect the startup commencement crank angle or during a low-speed startup operation (for example, in the case of a miskick).

Moreover, when a determination voltage threshold value for an initial fuel injection is set on the high voltage side in order to prevent an excessive fuel injection, fuel injection is not performed at the required timing, and startability deteriorates.

In the technique disclosed in Japanese Unexamined Patent Application, First Publication No. 2004-162543, when it is detected that the crank angle is at top dead center, it is necessary to determine that this top dead center is the intake top dead center. In engines that are only able to be cranked approximately three revolutions in a single startup operation, it is not possible to determine whether or not the stroke is the intake stroke at the top dead center. Moreover, there is a possibility that fuel will not be injected at the necessary timing because the determination is made after the compression top dead center at 360° to the rear has been exceeded due to the top dead center crank angle speed. As a result, it is not possible to ensure startability.

SUMMARY OF THE INVENTION

The invention was conceived in view of the above described circumstances and it is an object thereof to provide a furl injection control apparatus that, when an internal combustion engine is being started, prevents any deterioration in startability that is due to excessive fuel injection, and that is able to ensure startability.

In order to achieve the above described object, the fuel injection control apparatus of the invention, includes: an internal combustion engine; a fuel injection unit provided in, the internal combustion engine; an intake state detection unit that detects an intake state value indicating an intake state of the internal combustion engine, and mat outputs an intake state signal; and a control unit to which the intake state signal is input, that determines based on the intake state signal whether or not the internal combustion engine is on an intake stroke, and that controls the fuel injection unit so that an initial fuel injection is performed in order to start up the engine when the control unit determines that the engine is on an intake stroke.

Moreover, it is preferable that, in the fuel injection control apparatus of the invention, after the control unit has been activated, the control unit control the fuel injection unit so as to perform the initial fuel injection when a difference between an initial intake state value that is calculated based on the intake state signal and a current intake state value that is calculated at a predetermined cycle is equal to or greater than a predetermined value.

Moreover, it is preferable that the fuel injection control apparatus of the invention further include: an A/D converter to which the intake state signal is input, that converts the intake state signal into a digital signal, and that outputs the intake state signal that has been converted into the digital signal as a digital intake state signal; a time measurement unit; a storage unit; and a fuel injection drive unit that outputs to the fuel injection unit a drive signal in order to drive the fuel injection unit in accordance with a fuel injection control signal that is output from the control unit. In the fuel injection control apparatus, after the control unit has been activated, the control unit stores in the storage unit the initial intake state value which was calculated based on the digital intake state signal, controls the time measurement unit so as to measure the predetermined cycle, calculates the current intake state value based on the digital intake state signal each time the predetermined cycle passes, and outputs the fuel injection control signal in order to control the fuel injection unit so as to perform the initial fuel injection when the difference Between the initial intake state value and the current intake state value is equal to or greater than a predetermined value.

Moreover, it is preferable that the fuel injection control apparatus of the invention further include: a crank angle detection unit that is provided in the internal combustion engine, and that outputs a crank signal each time a crankshaft rotates by a predetermined angle in synchronization with a rotation of the crankshaft. In the fuel injection control apparatus, the crank signal and the intake state signal are input to the control unit, after the control unit has been activated, the control unit calculates the intake state value each time the crank signal is detected based on the crank signal and the intake state signal, and controls the fuel injection unit so as to perform the initial fuel injection when the difference between the intake state value when the initial crank signal was detected and the intake state value when the current crank signal was detected is equal to or greater than a predetermined value.

Moreover, it is preferable that the fuel injection control apparatus of the invention further include: an A/D converter to which the intake state signal is input, that converts the intake state signal into a digital signal, and that outputs the intake state signal that has been converted into the digital signal as a digital intake state signal; a waveform shaping unit to which the intake state signal is input, that performs waveform shaping so that the crank signals are formed into pulse signals formed in a square-wave form, and the cycle of the pulse signals being the time required for the rotation of the predetermined angle; a storage unit; and a fuel injection drive unit that outputs to the fuel injection unit a drive signal in order to drive the fuel injection unit in accordance with a fuel injection control signal that is output from the control unit. In the fuel injection control apparatus, after the control unit has been activated, the control unit calculates the intake state value each time the pulse signal is detected based on the pulse signal and the digital intake state signal, stores in the storage unit the intake state value when the initial pulse signal was detected, and outputs the fuel injection control signal in order to control the fuel injection unit so as to perform the initial fuel injection when the difference between the intake state value when the initial pulse signal was detected and the intake state value when the current pulse signal was detected is equal to or greater than a predetermined value.

Moreover, it is preferable that the fuel injection control apparatus of the invention further include: a crank angle detection unit that is provided in the internal combustion engine, and that outputs a crank signal each time a crankshaft rotates by a predetermined angle in synchronization with a rotation of the crankshaft. In the fuel injection control apparatus, the crank signal and the intake state signal are input to the control unit, after the control unit has been activated, the control unit calculates the intake state value when a crank signal is detected based on the crank signal and the intake state signal, and controls the fuel injection unit so as to perform the initial fuel injection when the difference between the intake state value when the initial crank signal was detected and the intake state value when the current crank signal was detected is equal to or greater than a predetermined value and when an inter-crank signal time between the previous crank signal detection and the current crank signal detection is equal to or less than a predetermined value.

Moreover, it is preferable that the fuel injection control apparatus of the invention further include: an A/D converter to which the intake state signal is input, that converts the intake state signal into a digital signal, and that outputs the intake state signal that has been converted into the digital signal as a digital intake state signal; a waveform shaping unit to which the intake state signal is input, that performs waveform shaping so that the crank signals are formed into pulse signals formed in a square-wave form, and the cycle of the pulse signals being the time required for the rotation of the predetermined angle; a time measurement unit; a storage unit; and a fuel injection drive unit that outputs to the fuel injection unit a drive signal in order to drive the fuel injection unit in accordance with a fuel injection control signal that is output from the control unit In the fuel injection control apparatus, after the control unit has been activated, the control unit calculates the intake state value each time the pulse signal is detected based on the pulse signal and the digital intake state signal, controls the time measurement unit so as to measure the time between the detection of the previous pulse signal and the detection of the current pulse signal, stores in the storage unit the intake state value when the initial pulse signal was detected, and outputs the fuel injection control signal in order to control the fuel injection unit so as to perform the initial fuel injection when the difference between the intake state value when the initial pulse signal was detected and the intake state value when the current pulse signal was detected is equal to or greater than a predetermined value and when inter-crank signal time between the previous pulse signal detection and the current pulse signal detection is equal to or less than a predetermined value.

Moreover, it is preferable that, in the fuel injection control apparatus of the invention, when the inter-crank signal time is greater than a predetermined value, the control unit do not perform the initial fuel injection.

Moreover, it is preferable that, in the fuel injection control apparatus of the invention, an intake pressure signal corresponding to the intake pressure inside an intake pipe of the internal combustion engine or an intake rate signal corresponding to the intake rate inside the intake pipe be used as the intake state signal.

According to the invention, when an engine is being started up, because the initial fuel injection is performed when the engine is on the intake stroke, it is possible to perform the fuel injection for startup at the required timing based on the engine stroke.

As a result, fuel injection is not performed at startup during the operation to detect the startup commencement crank angle, and excessive fuel does not get supplied to the intake pipe and combustion chamber. Accordingly, it is possible to prevent any deterioration in startability during a startup operation.

DETAILED DESCRIPTION OF THE INVENTION

An embodiment of the invention will be described with reference made to the drawings.

Figure 1:
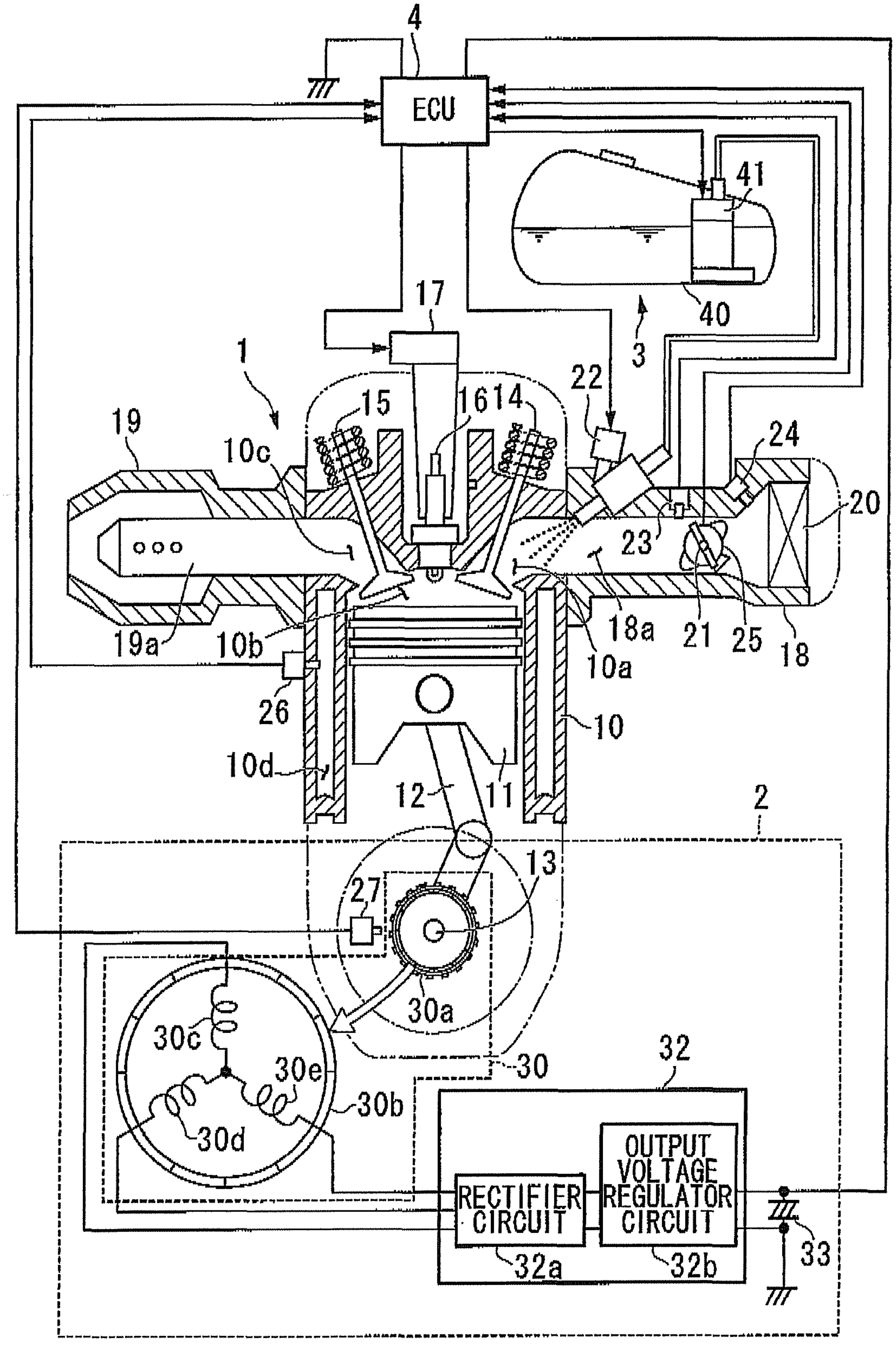
FIG. 1 is a structural schematic view showing an engine system that is provided with a fuel injection control apparatus (ECU 4) according to an embodiment of the invention.

FIG. 1 is a structural schematic view showing an engine control system that is provided with the fuel injection control apparatus (referred to below as an ECU) of the embodiment.

As shown in FIG. 1, the engine control system of the embodiment is schematically formed by an engine 1, a power supply unit 2, a fuel supply unit 3, and an ECU (Engine Control Unit) 4.

A batteryless system that is not provided with a battery, but instead performs engine startup by manual cranking (for example, by kick-starting) is described as an example of the engine control system of the embodiment.

The engine (i.e., internal combustion engine) 1 is a four-stroke single-cylinder engine, and schematically includes a cylinder 10, a piston 11, a conrod 12, a crankshaft 13, an intake valve 14, an exhaust valve 15, a spark plug 16, an ignition coil 17, an intake pipe 18, an exhaust pipe 19, an air cleaner 20, a throttle valve 21, an injector 22, an intake pressure sensor 23, an intake temperature sensor 24, a throttle opening angle sensor 25, a cooling water temperature sensor 26, and a crank angle sensor 27.

The cylinder 10 is a hollow circular cylinder-shaped component that is used to make the piston 11 that is located inside it undergo a reciprocating motion by repeating a four-stroke cycle consisting of intake, compression, combustion (i.e., expansion), and exhaust.

The cylinder 10 has an intake port 10*a*, a combustion chamber 10*b*, and an exhaust port 10*c*.

The intake port 10*a* is a flow path that is used to supply a mixture formed from air and fuel to the combustion chamber 10*b*.

The combustion chamber 10*b* is a space that is used to store the aforementioned mixture and cause mixture that has been compressed in the compression stroke to be combusted in the combustion stroke.

The exhaust port 10*c* is a flow path that is used to discharge exhaust gas from the combustion chamber 10*b* to the outside in the exhaust stroke.

Moreover, a water cooling path 10*d* that is used to circulate cooling water is provided in an outer wall of the cylinder 10.

The crankshaft 13 that is used to convert the reciprocating motion of the piston 11 into rotational motion is joined via the conrod 12 to the piston 11.

The crankshaft 13 extends in a direction that is orthogonal to the reciprocation direction of the piston 11. A flywheel (not shown), a mission gear, a kick gear that is joined to a kick pedal that is used to start the engine 1 manually, and a rotor 30*a* of the power supply unit 2 (described below) are joined to the crankshaft 13.

The intake valve 14 is a valve component that is used to open and close an aperture portion of the air intake port 10*a* which is near to the combustion chamber 10*b*, and is joined to a camshaft (not shown). The intake valve 14 is driven to open and close in accordance with the respective strokes by this camshaft.

The exhaust valve 15 is a valve component that is used to open and close an aperture portion of the air exhaust port 10*c* which is near to the combustion chamber 10*b*, and is joined to a camshaft (not shown). The exhaust valve 15 is driven to open and close in accordance with the respective strokes by this camshaft.

The spark plug 16 has electrodes that face towards the interior of the combustion chamber 10*b*, and is provided in a topmost portion of the combustion chamber 10*b*. The spark plug 16 generates a spark between the electrodes by a high-voltage ignition voltage signal that is supplied from the ignition coil 17.

The ignition coil 17 is a transformer that is formed by a primary coil and a secondary coil. The ignition coil 17 boosts an ignition voltage signal that is supplied from the ECU 4 to the primary coil, and supplies an ignition voltage signal from the secondary coil to the spark plug 16.

The intake pipe 18 is an air supply pipe, and has an intake flow path 18*a* provided inside it.

The intake pipe 18 is joined to the cylinder 10 so that the intake flow path 18*a* is connected to the intake port 10*a*.

The exhaust pipe 19 is a pipe for discharging exhaust gas, and has an exhaust flow path 19*a* provided inside it.

The exhaust pipe 19 is joined to the cylinder 10 so that the exhaust flow path 19*a* is connected to the exhaust port 10*c*.

The air cleaner 20 is located upstream from the air flowing through the interior of the intake pipe 18.

The air cleaner 20 purifies air taken in from the outside and supplies it to the intake flow path 18*a*.

The throttle valve 21 is provided inside the intake flow path 18*a*, and pivots by a throttle (not shown) or an accelerator. Namely, the cross-sectional area of the intake flow path 18*a* is changed by the pivoting of the throttle valve 21, and the air intake quantity is accordingly changed.

The injector (i.e., a fuel injection unit) 22 has an injection aperture that injects fuel that is supplied from the fuel supply unit 3 in accordance with injector drive signals that are supplied from the ECU 4.

The injector 22 is provided inside the intake pipe 18 so that the injection aperture faces the intake port 10*a*.

The intake pressure sensor (i.e., intake state detection unit) 23 is, for example, a semiconductor pressure sensor that utilizes a piezoresistive effect.

The intake pressure sensor 23 is provided in the intake pipe 18 at a position downstream from the airflow passing through the throttle valve 21 so that a sensitive surface of the intake pressure sensor 23 is oriented towards the intake flow path 18*a*.

The intake pressure sensor 23 outputs intake pressure signals (intake state signals) that correspond to the intake pressure (an intake state value) inside the intake pipe 18 to the ECU 4.

The intake temperature sensor 24 is provided in the intake pipe 18 at a position upstream from the airflow passing through the throttle valve 21 so that a sensitive portion of the intake temperature sensor 24 is oriented towards the intake flow path 18*a*.

The intake temperature sensor 24 outputs intake temperature signals that correspond to the intake air temperature inside the intake pipe 18 to the ECU 4.

The throttle opening angle sensor 25 outputs throttle opening angle signals that correspond to the opening angle of the throttle valve 21 to the ECU 4.

The cooling water temperature sensor 26 is provided so that a sensitive portion of the cooling water temperature sensor 26 is oriented towards the cooling water path 10*d* of the cylinder 10.

The cooling water temperature sensor 26 outputs cooling water temperature signals that correspond to the temperature of the cooling water flowing through the cooling water path 10*d* to the ECU 4.

The crank angle sensor (i.e., a crank angle detection unit) 27 outputs a crank signal each time the crankshaft 13 rotates by a predetermined angle in synchronization with the rotation of the crankshaft 13. The crank angle sensor 27 is described in detail below.

The power supply unit 2 includes a generator 30, a regulate rectifier 32, and a condenser 33.

The generator 30 is a magnetic AC generator and includes a rotor 30*a*, permanent magnets 30*b*, and 3-phase stator coils 30*c*, 30*d*, and 30*e*.

The rotor 30*a* is joined to the crankshaft 13 of the engine 1 and rotates in synchronization therewith.

The permanent magnets 30*b* are mounted on an inner circumferential side of the rotor 30*a*.

The 3-phase stator coils 30*c*, 30*d*, and 30*e* are coils that are used to obtain generated output.

Namely, in the generator 30, as a result of the rotor 30*a* (in other words, the permanent magnets 30*b*) rotating relative to the fixed stator coils 30*c*, 30*d*, and 30*e*, 3-phase AC voltage is generated by electromagnetic induction from the stator coils 30*c*, 30*d*, and 30*e*. The generated 3-phase AC voltage is output to the regulate rectifier 32.

Figure 2:
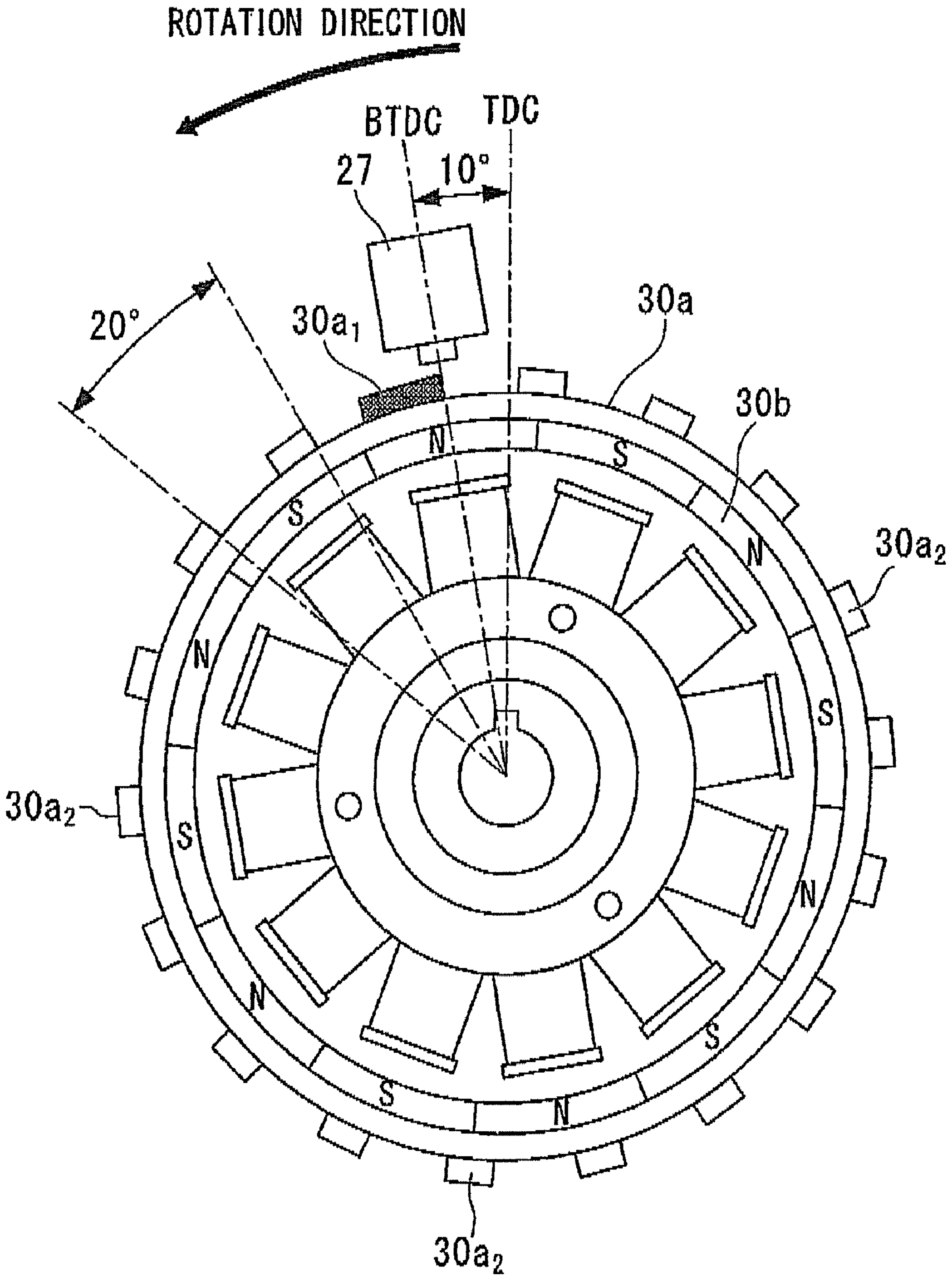
FIG. 2 is a detailed explanatory diagram showing a rotor 30*a* constituting a generator 30 according to an embodiment of the invention.

As shown in FIG. 2, a plurality of projections is formed on an outer circumference of the rotor 30*a* extending in the rotation direction of the rotor 30*a*.

Specifically, a plurality of projections (i.e., auxiliary projections) $\mathbf{30}a_2$ whose length is shorter in the rotation direction, and a projection (i.e., a crank angle reference projection) $\mathbf{30}a_1$ whose length in the rotation direction is longer than that of the projections $\mathbf{30}a_2$, are formed on the outer circumference of the rotor 30*a*.

Here, the length of the crank angle reference projection $\mathbf{30}a_1$ is, as an example, approximately twice the length of the auxiliary projections $\mathbf{30}a_2$.

The plurality of auxiliary projections $\mathbf{30}a_2$ and the crank angle reference projection $\mathbf{30}a_1$ are provided so that the respective rear ends of each of the plurality of auxiliary projections $\mathbf{30}a_2$ and the crank angle reference projection 30*a* i are located at the same angular interval (for example, at 20° intervals).

In the embodiment, the crank angle reference position is a position to the front in the rotation direction of a position corresponding to the top dead center TDC, for example, the position BTDC 10° which is a position 10° before the top dead center.

In addition, the position of the rear end of the crank angle reference projection $\mathbf{30}a_1$ matches the crank angle reference position.

Moreover, the permanent magnets 30*b* are mounted on the inner circumferential side of the rotor 30*a*.

Specifically, the permanent magnets 30*b* that are constructed with an N pole and an S pole forming one set are placed every 60° along the inner circumferential side of the rotor 30*a*.

The aforementioned crank angle sensor 27 is, for example, an electromagnetic pickup sensor and, as shown in FIG. 2, is provided in the vicinity of the outer circumference of the rotor 30*a*.

The crank angle sensor 27 outputs a pair of pulse signals having mutually different polarities each time the crank angle reference projection $\mathbf{30}a_1$ and the auxiliary projections $\mathbf{30}a_2$ pass the vicinity of the crank angle sensor 27.

More specifically, the crank angle sensor 27 outputs a pulse signal having a negative polarity amplitude when the front end of each projection goes past in the rotation direction, and outputs a pulse signal having a positive polarity amplitude when the rear end of each projection goes past in the rotation direction.

The description returns now to FIG. 1.

The regulate rectifier 32 includes a rectifier circuit 32*a* and an output voltage regulator circuit 32*b*.

The rectifier circuit 32*a* includes six rectifier circuits that are connected in a 3-phase bridge structure and are used to rectify the 3-phase AC voltage input from the respective stator coils 30*c*, 30*d*, and 30*e*. The rectifier circuit 32*a* rectifies this 3-phase AC voltage to DC voltage and outputs it to the output voltage regulator circuit 32*b*.

The output voltage regulator circuit 32*b* rectifies the DC voltage input from the rectifier circuit 32*a*, and generates power supply voltage for the ECU 4 which it then supplies to the ECU 4.

The condenser 33 is a smoothing condenser for stabilizing the power supply, and both ends thereof are connected between the output terminals of the output voltage regulator circuit 32*b*.

The fuel supply unit 3 is formed by a fuel tank 40 and a fuel pump 41.

The fuel tank 40 is a container that is used to hold fuel such as, for example, gasoline.

The fuel pump 41 is provided inside the fuel tank 40, and pumps out fuel inside the fuel tank 40 and supplies it to the injector 22 in accordance with pump drive signals input from the ECU 4.

Figure 3:
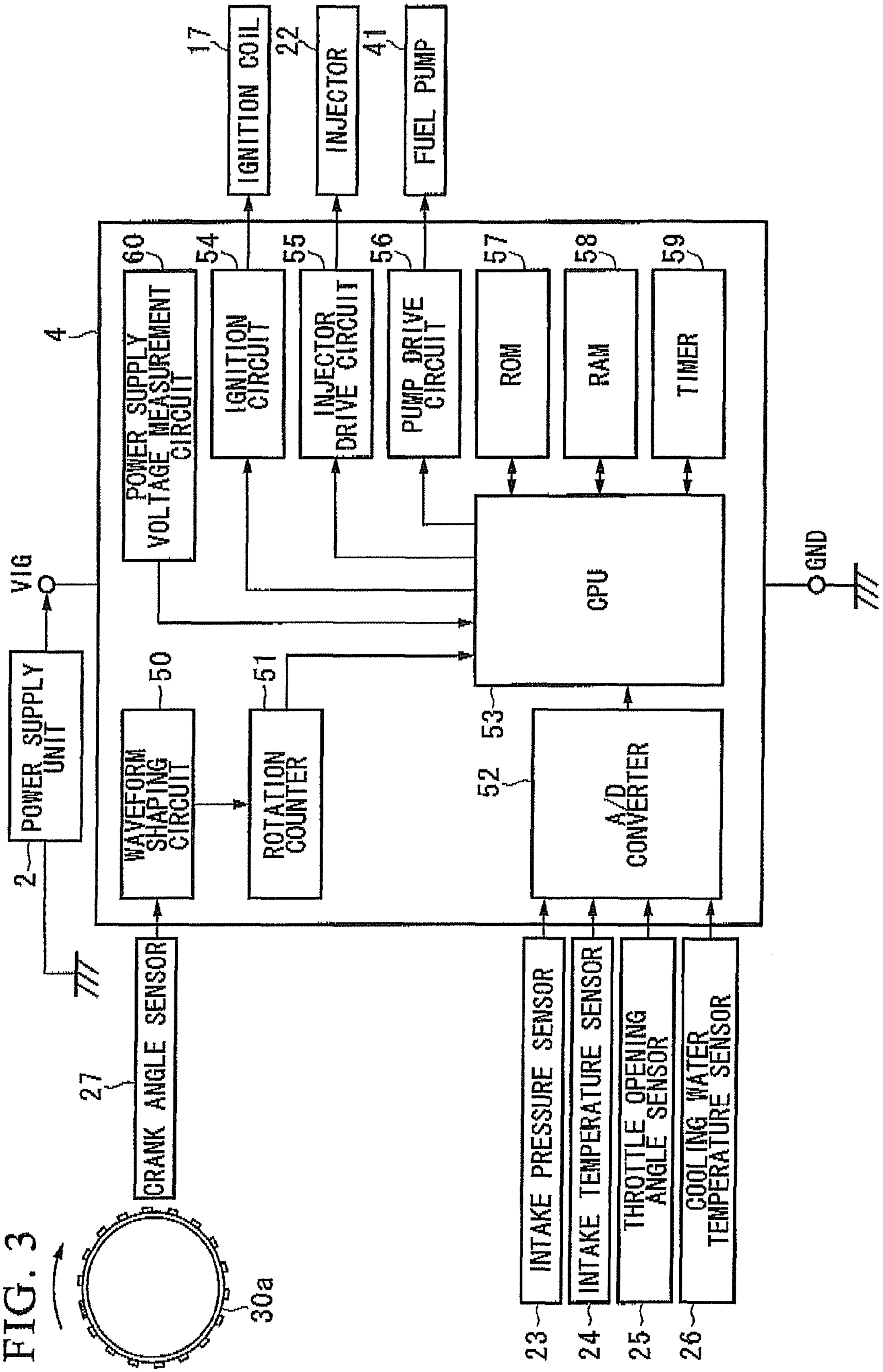
FIG. 3 is a structural block diagram of a fuel injection control apparatus (ECU 4) according to an embodiment of the invention.

As shown in FIG. 3, the ECU 4 includes a waveform shaping circuit 50, a rotation counter 51, an A/D converter 52, a CPU (Central Processing Unit) 53, an ignition circuit 54, an injector drive circuit 55, a pump drive circuit 56, ROM (Read Only Memory) 57, RAM (Random Access Memory) 58, a timer 59, and a power supply voltage measuring circuit 60.

The ECU 4 which is constructed in this manner is driven by power supply voltage that is supplied from the power supply unit 2.

A $V_{IG}$ terminal of the ECU 4 is connected to an output terminal on a positive pole side of the output voltage regulator circuit 32*b*.

A GND terminal of the ECU 4 is connected to a ground line and to an output terminal on a negative pole side of the output voltage regulator circuit 32*b*.

The waveform shaping circuit (waveform shaping unit) 50 performs waveform shaping to change pulse form crank signals that are input from the crank angle sensor 27 into square-wave pulse signals (for example, to change negative polarity crank signals into high level signals, and change positive polarity crank and ground level crank signals into low level signals), and outputs the waveform-shaped signals to the rotation counter 51 and the CPU 53.

Namely, these square-wave pulse signals are square-wave pulse signals whose cycle is the length of time it takes for the crankshaft 13 to rotate 20°.

The rotation counter 51 calculates the engine speed based on the square-wave pulse signals that are output from the above-described waveform shaping circuit 50, and outputs a rotation count signal that shows the relevant engine speed to the CPU 53.

The A/D converter (A/D conversion unit) 52 converts into digital signals intake pressure sensor outputs that are output from the intake pressure sensor 23, intake temperature sensor outputs that are output from the intake temperature sensor 24, throttle opening angle sensor outputs that are output from the throttle opening angle sensor 25, and cooling water temperature sensor outputs that are output from the cooling water temperature sensor 26, and then outputs these digital signals to the CPU 53.

The CPU (i.e., control unit) 53 executes an engine control program that is stored in the ROM 57, and performs control of the fuel injection, ignition, and fuel supply of the engine 1 based on the crank signals, the rotation count signals that are output from the rotation counter 51, the intake pressure values that have been converted by the A/D converter 52, the throttle opening angle values and cooling water temperature values, and on the power supply voltage values that are output from the power supply voltage measuring circuit 60.

Specifically, the CPU 53 outputs ignition control signals to the ignition circuit 54 in order to cause the spark plug 16 to spark at the ignition timing. The CPU 53 also outputs fuel injection control signals to the injector drive circuit 55 in order to cause a predetermined quantity of fuel to be injected from the injector 22 at the fuel injection timing, and also outputs fuel supply control signals to the pump drive circuit 56 in order for fuel to be supplied to the injector 22.

The ignition circuit 54 is provided with a condenser (not shown) that accumulates $V_{IG}$ voltage, namely, the power supply voltage which is supplied from the power supply unit 2, and, in accordance with an ignition control signal input from the above-described CPU 53, discharges the electric charge which has accumulated in the condenser as an ignition voltage signal to a primary coil of the ignition coil 17.

In accordance with fuel injection control signals that are input from the above described CPU 53, the injector drive circuit (fuel injection drive unit) 55 generates injector drive signals in order to cause a predetermined quantity of fuel to be injected from the injector 22, and outputs these injector drive signals to the injector 22.

In accordance with fuel supply control signals that are input from the CPU 53, the pump drive circuit 56 generates pump drive signals in order to cause fuel to be supplied from the fuel pump 41 to the injector 22, and outputs these pump drive signals to the fuel pump 41.

The ROM 57 is non-volatile memory in which engine control programs that are executed by the CPU 53 and various types of data are stored in advance.

The RAM (storage unit) 58 is working memory that is used to temporarily hold data when the CPU 53 is executing an engine control program and performing various operations.

The timer 59 (time measurement unit) performs predetermined timer (i.e., clock) operations under the control of the CPU 53.

The power supply voltage measuring circuit 60 measures voltage values of the power supply voltage that is supplied from the regulate rectifier 32, and outputs the measurement results to the CPU 53 as power supply voltage values.

Next, a description will be given of the initial fuel injection processing performed by the ECU 4 (in particular, by the CPU 53) in an engine control system that is provided with the ECU 4 (i.e., the fuel injection control apparatus) of the embodiment that is constructed in the manner described above.

There are two types of initial fuel injection processing in the embodiment, namely, initial fuel injection processing which is performed in synchronization with the engine 1 (namely, in synchronization with the rotation of the crankshaft 13), and initial fuel injection processing which is performed not in synchronization with the engine 1. The initial fuel injection processing which is performed not in synchronization with the engine will be described below first with reference made to FIGS. 4 and 5.

Engine non-synchronized initial fuel injection processing

Figure 4:
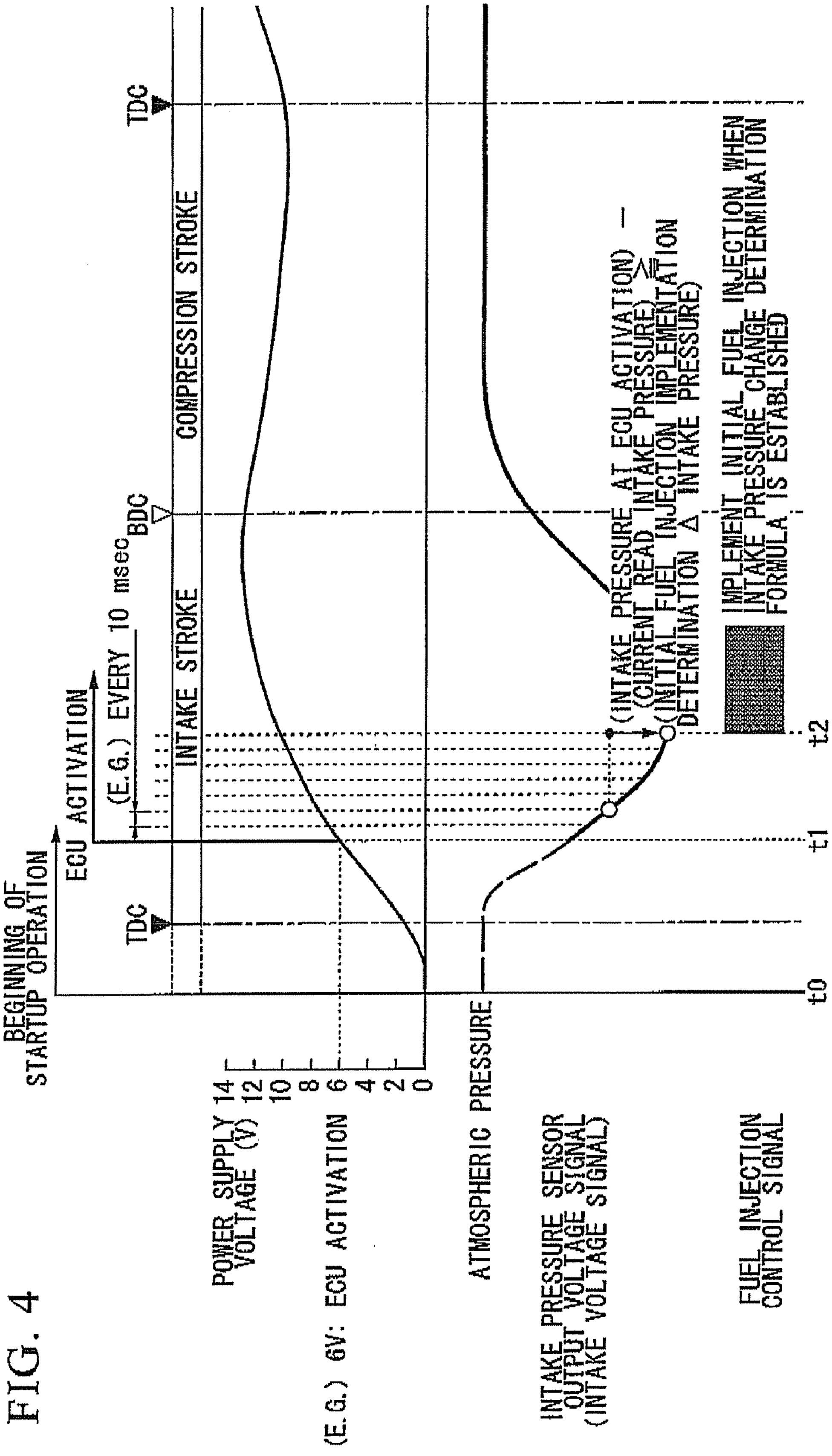
FIG. 4 is an explanatory diagram relating to an operation of the fuel injection control apparatus (ECU 4) according to an embodiment of the invention.

FIG. 4 is a timing chart showing a mutual relationship between the power supply voltage that is supplied to the ECU 4 from the power supply unit 2, the intake pressure signals (i.e., analog voltage signals) that are output from the intake pressure sensor 23, and the fuel injection control signals that are output from the CPU 53.

Figure 5:
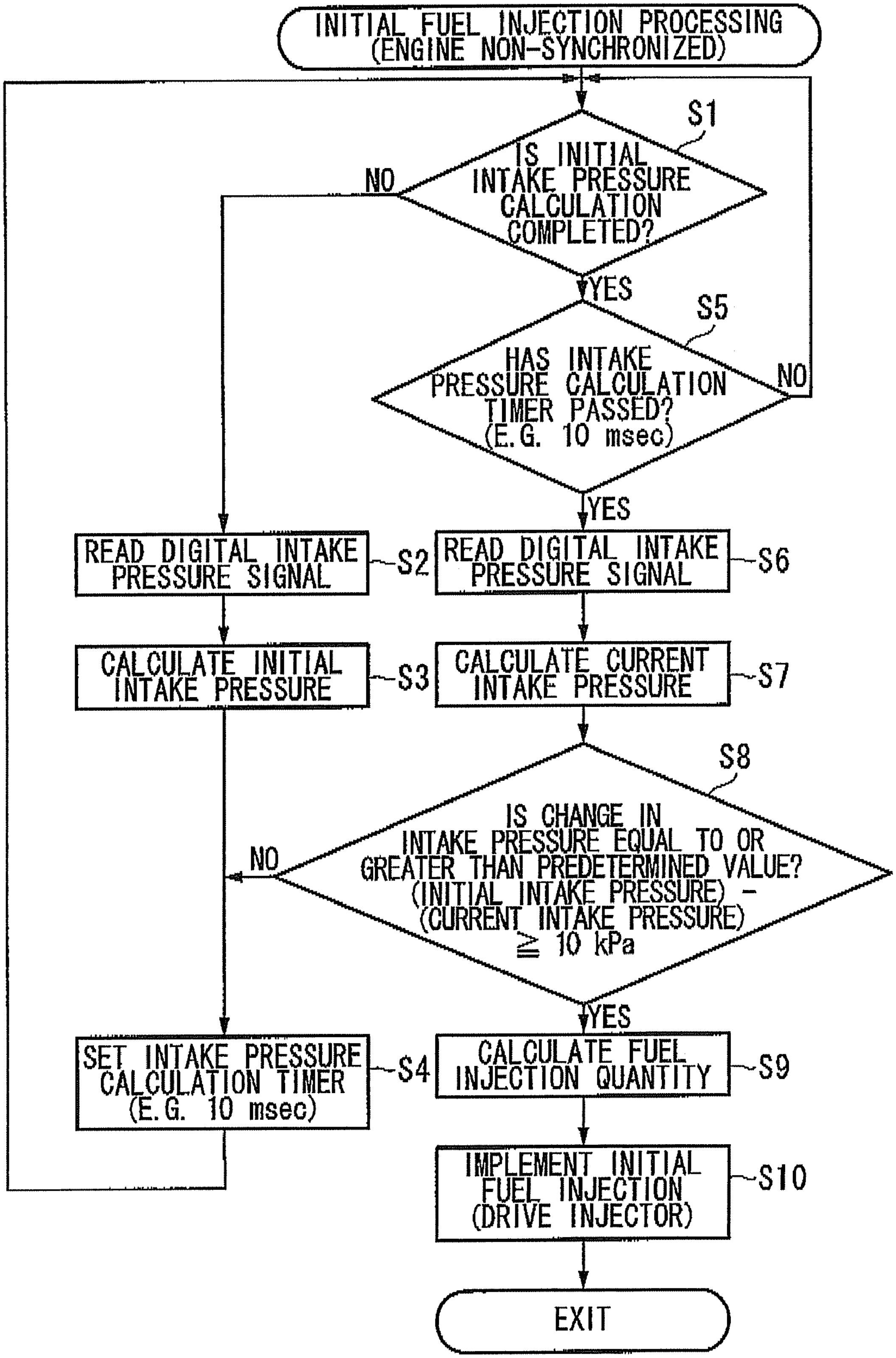
FIG. 5 is a flowchart relating to an operation of the fuel injection control apparatus (ECU 4) according to an embodiment of the invention.

FIG. 5 is an operation flowchart of the CPU 53 relating to the engine non-synchronized initial fuel injection processing.

In the embodiment, because the engine control system is assumed to be a batteryless system, it is not possible for power supply voltage to be supplied to the ECU 4 unless 3-phase AC voltage from the generator 30 is generated by the rotation of the crankshaft 13.

Accordingly, when a user is starting up the engine 1, it is necessary to perform a predetermined starting operation (in the embodiment, this involves kick-starting), and cause the crankshaft 13 to rotate.

In the embodiment, as shown in FIG. 4, a startup operation begins at the time t0, and, at the time t1, the power supply voltage that is supplied to the ECU 4 from the power supply unit 2 reaches 6V, which is required in order for the ECU 4 to be activated.

Namely, the ECU 4 is activated at the time t1, and the CPU 53 commences the operation shown in the flowchart in FIG. 5.

As shown in FIG. 5, firstly the CPU 53 determines whether or not the calculation of the initial intake pressure after startup has been completed (step S1).

An intake pressure signal which has been converted by the A/D converter 52 is input into the CPU 53 at the timing t1 and also subsequently thereto. However, because this digital intake pressure signal is a signal which shows a voltage value that corresponds to the intake pressure, it is necessary to calculate the intake pressure from the voltage value of the digital intake pressure signal.

In step S1, if the CPU 53 determined that the calculation of the initial intake pressure after startup has not been completed (i.e., NO), the CPU 53 reads the digital intake pressure signal from the A/D converter 52 (step S2), and calculates the initial intake pressure from the read voltage value of the digital intake pressure signal.

Here, the CPU 53 stores the calculated intake pressure in the RAM 58.

The CPU 53 then controls the timer 59 so that a timing is set for the intake pressure calculation cycle (for example, 10 msec), and the routine returns to the processing of step S1 (step S4).

If, however, in step S1, the CPU 53 determined that the calculation of the initial intake pressure after startup has been completed (i.e., YES), the CPU 53 checks the timer operation of the timer 59, and determines whether or not the intake pressure calculation cycle has passed (step S5).

In step S5, if the CPU 53 determined that the intake pressure calculation cycle has not passed (i.e., NO), the CPU 53 returns to the processing of step S1.

If, however, in step S5, the CPU 53 determined that the intake pressure calculation cycle has passed (i.e., YES), the CPU 53 reads the digital intake pressure signal from the A/D converter 52 (step S6), and calculates the current intake pressure from the voltage value of the read digital intake pressure signal (step S7).

Next, the CPU 53 retrieves the initial intake pressure from the RAM 58, and determines whether or not the difference between the initial intake pressure and the current intake pressure is equal to or greater than a predetermined value (for example, 10 kPa) (step S8).

As shown in FIG. 4, when the engine 1 is on the intake stroke, the intake pressure inside the intake pipe 18 is a negative pressure due to the fall of the piston 10. Consequently, the intake pressure signal is a voltage signal having a negative polarity amplitude.

Accordingly, if the difference between the initial intake pressure and the current intake pressure is equal to or greater than a predetermined value, then it is possible to determine that the engine 1 is on the intake stroke.

Namely, the processing of step S8 corresponds to processing to determine whether or not the engine 1 is on the intake stroke.

In step S8, if the difference between the initial intake pressure and the current intake pressure is less than the predetermined value (i.e., NO), the CPU 53 moves to the processing of step S4, and controls the timer 59 so that the intake pressure calculation cycle is reset.

Namely, the processing of steps SI through S8 is repeated until the CPU 53 determines in step S8 that the difference between the initial intake pressure and the current intake pressure is equal to or greater than the predetermined value, and each time the intake pressure calculation cycle passes, a new current intake pressure is calculated and is compared with the initial intake pressure.

If, however, in step S8, the CPU 53 determined that the difference between the initial intake pressure and the current intake pressure is equal to or greater than the predetermined value at the time t2 shown in FIG. 4, namely, if the CPU 53 determined that the engine 1 is on the intake stroke (i.e., YES), the CPU 53 calculates the fuel injection quantity based on the power supply voltage value and the rooting water temperature (step S9).

Specifically, a table showing a mutual relationship between the power supply voltage value and the fuel injection quantity is stored in the ROM 57. The CPU 53 extracts from this table the fuel injection quantity that corresponds to the power supply voltage value obtained from the power supply voltage measurement circuit 60, and the final fuel injection quantity is calculated by amending the extracted fuel injection quantity based on the cooling water temperature value obtained from the A/D converter 52.

Next, taking the time t2 as the initial fuel injection timing, the CPU 53 outputs to the injector drive circuit 55 a fuel injection control signal in order to cause fuel corresponding to the fuel injection quantity calculated in step S9 to be injected (step S10).

As a result, an injector drive signal corresponding to the fuel injection control signal is output from the injector drive circuit 55 to the injector 22, and the initial fuel injection for engine startup is performed by the injector 22.

As described above, according to the embodiment, when an engine is being started up, because the initial fuel injection is performed when the engine is on the intake stroke, it is possible to perform the fuel injection for startup at the required timing based on the engine stroke.

As a result, fuel injection is not performed at startup during the operation to detect the startup commencement crank angle, and excessive fuel does not get supplied to the intake pipe and combustion chamber. Accordingly, it is possible to prevent any deterioration in startability during a startup operation.

Engine-synchronized initial fuel injection processing

Next, engine-synchronized initial fuel injection processing will be described with reference made to FIGS. 6 and 7.

Figure 6:
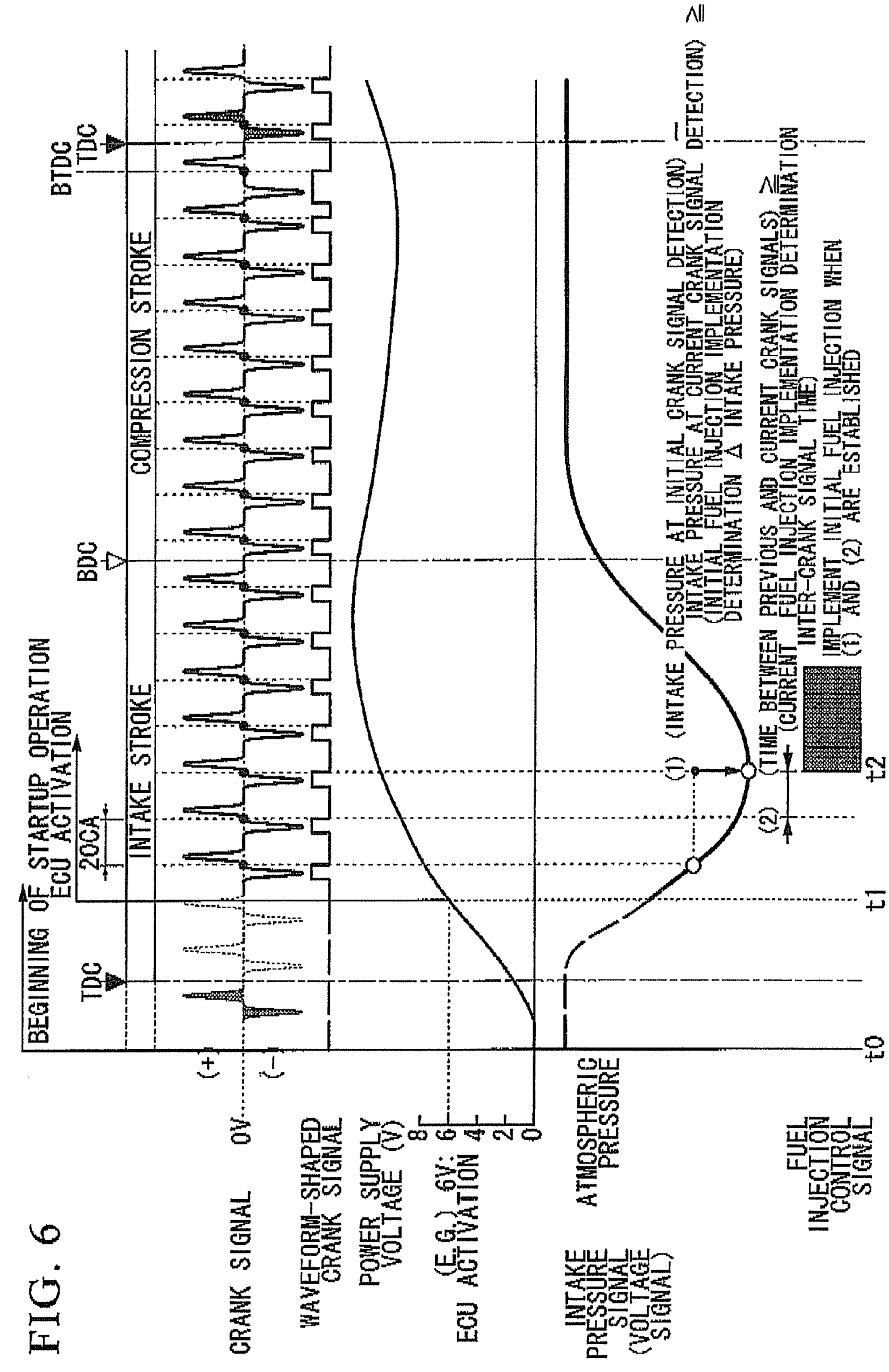
FIG. 6 is an explanatory diagram relating to an operation of the fuel injection control apparatus (ECU 4) according to an embodiment of the invention.

FIG. 6 is a tinting chart showing a mutual relationship between the crank signals that are output from the crank angle sensor 27, the waveform-shaped crank signals (i.e., square-wave pulse signals) that are output from the waveform shaping circuit 50, the power supply voltage that is supplied to the ECU 4 from the power supply unit 2, the intake pressure signals that are output from the intake pressure sensor 23, and the fuel injection control signals that are output from the CPU 53.

Figure 7:
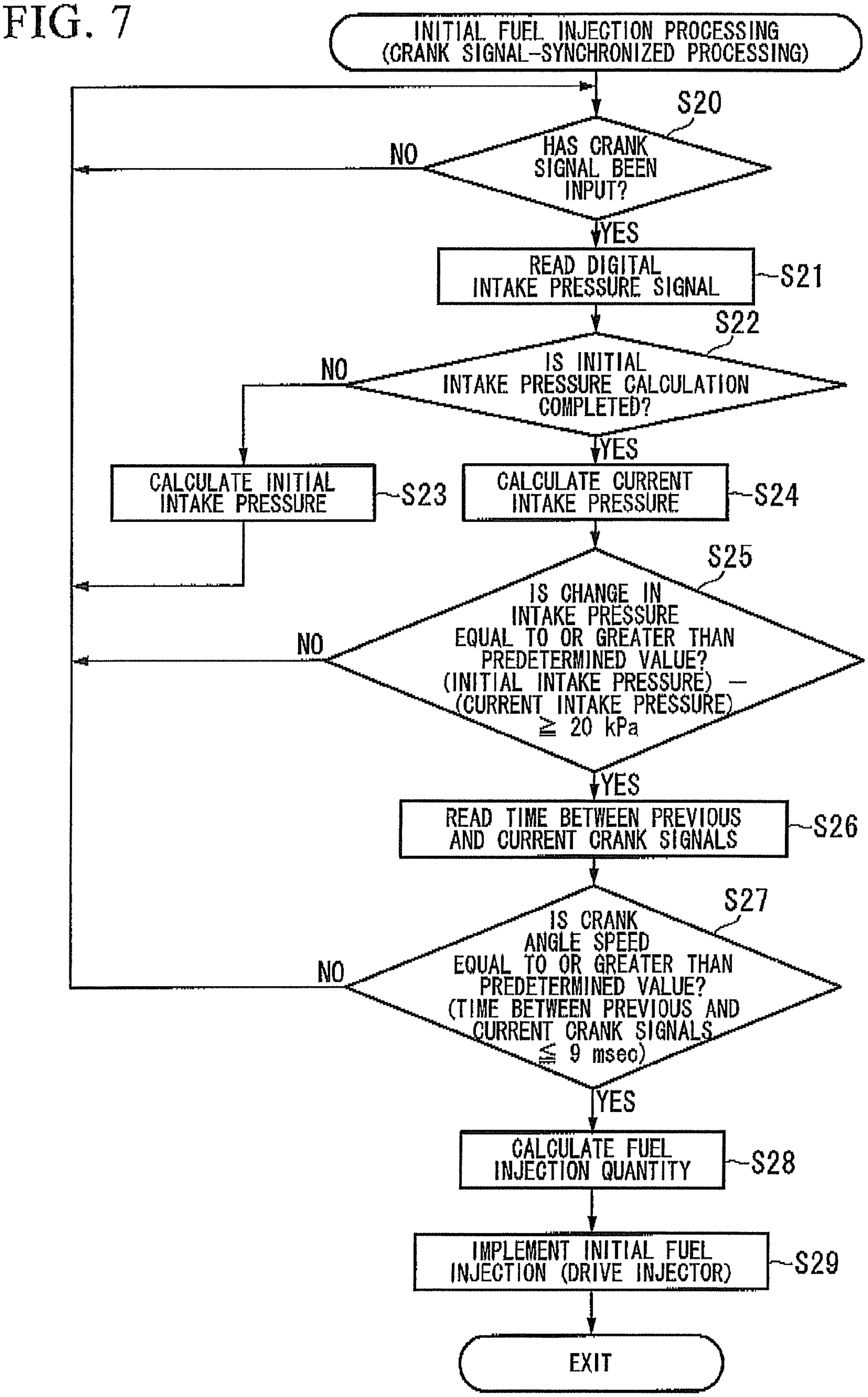
FIG. 7 is a flowchart diagram relating to an operation of the fuel injection control apparatus (ECU 4) according to an embodiment of the invention.

FIG. 7 is an operation flowchart of the CPU 53 relating to the engine-synchronized initial fuel injection processing.

As shown in FIG. 6, in the same way as in FIG. 4, a startup operation begins at the time t0, and, at the time t1, the power supply voltage that is supplied to the ECU 4 from the power supply unit 2 reaches 6V, which is required in order for the ECU 4 to be activated.

Moreover, the rotor 30*a* is also rotated by the startup operation in synchronization with the rotation of the crankshaft 13. As shown in FIG. 6, the crank angle sensor 27 outputs a pulse crank signal having a negative polarity amplitude when the front end of each projection goes past in the rotation direction, and outputs a pulse crank signal having a positive polarity amplitude when the rear end of each projection goes past in the rotation direction.

The waveform shaping circuit 50 outputs crank signals that have undergone waveform shaping so that negative polarity crank signals are changed into high level signals, and positive polarity crank signals and ground level crank signals are changed into low level signals.

Namely, the time between failing edges of waveform-shaped crank signals corresponds to the length of time it takes for the crankshaft 13 to rotate 20°.

As shown in FIG. 7, firstly, when the CPU 53 is activated at the time t1, the CPU 53 determines whether or not a waveform-shaped crank signal has been input from the waveform shaping circuit 50 (i.e., whether or not a falling edge has been detected) (step S20). If a waveform-shaped crank signal has not been input (i.e., NO), the CPU 53 repeats the processing of step S20.

If, however, in step S20, the CPU 53 determined that a waveform-shaped crank signal has been input (i.e., YES), the CPU 53 reads the digital intake pressure signal from the A/D converter 52 (step S21), and determines whether or not the calculation of the initial intake pressure after activation has been completed (step S22).

In step S22, if the CPU 53 determined that the initial intake pressure after activation has not yet been calculated (i.e., NO), the CPU 53 calculates the initial intake pressure from the voltage value of the digital intake pressure signal read in step S21, namely, the intake pressure when the initial crank signal (i.e., pulse signal) was detected after activation (step S23).

Here, the CPU 53 stores the calculated initial intake pressure in the RAM 58, and also controls the timer 59 so that the time measurement commences in synchronization with the falling edge of the initial crank signal.

Thereafter, the CPU 53 returns to the processing of step S20.

If, however, the CPU 53 determined in step S22 that the initial intake pressure after activation has been calculated (i.e., YES), the CPU 53 calculates the current intake pressure from the voltage value of the digital intake pressure signal read in step S21, namely, the intake pressure when the current crank signal was detected after activation (step S24).

Here, the CPU 53 controls the timer 59 so that the time measurement ends in synchronization with the falling edge of the current crank signal, and stores the time measurement results, namely, the time between the point when the falling edge of the previous crank signal was detected and the point when the falling edge of the current crank signal was detected (referred to hereinafter as an inter-crank signal time) in the RAM 58, and then commences the next time measurement.

The CPU 53 then reads the initial intake pressure from the RAM 58 and determines whether or not the difference between the initial intake pressure and the current intake pressure is equal to or greater than a predetermined value (for example, 20 kPa) (step S25).

If the CPU 53 determined in step S25 that the difference between the initial intake pressure and the current intake pressure is less than a predetermined value (i.e., NO), the CPU 53 moves to the processing of step S20, and waits for the input of a waveform-shaped crank signal.

Namely, the processing of steps S20 through S25 is repeated until the CPU 53 determines in step S25 that the difference between the initial intake pressure and the current intake pressure is equal to or greater than the predetermined value, and each time a waveform-shaped crank signal is input (i.e., each time the crankshaft 13 rotates 20°), a new current intake pressure is calculated and is then compared with the initial intake pressure (during this time, a new inter-crank signal time is stored in the RAM 58 each time a falling edge of a waveform-shaped crank signal is generated).

If, however, in step S25, the CPU 53 determined that the difference between the initial intake pressure and the current intake pressure is equal to or greater than the predetermined value at the time t2 shown in FIG. 6, namely, if the CPU 53 determined that the engine 1 is on an intake stroke (i.e., YES), the CPU 53 reads the most recent inter-crank signal time from the RAM 58 (step S26), and determines whether or not this inter-crank signal time is equal to or less than a predetermined value (for example, 9 msec) (step S27).

Namely, in step S27, using the inter-crank signal time at the final timing (i.e., intake stroke) before the compression top dead center where ignition is performed and where the fuel injection required for startup is made, the CPU 53 determined whether or not the engine speed is able to reach or exceed the compression top dead center. In step S27, if the CPU 53 determined that the inter-crank signal time is equal to or less than the predetermined value, namely, if the engine speed is able to reach or exceed the compression top dead center (i.e., YES), the CPU 53 calculates the fuel injection quantity based on the power supply voltage value and the cooling water temperature (step S28). Taking this timing t2 as the initial fuel injection timing, the CPU 53 then outputs to the injector drive circuit 55 a fuel injection control signal in order to cause fuel to be injected corresponding to the fuel injection quantity calculated in step S28 (step S29).

As a result, an injector drive signal that corresponds to the fuel injection control signal from the injector drive circuit 55 is output to the injector 22, and the initial fuel injection is performed from the injector 22 when the engine is started up.

In contrast, if the inter-crank signal time is greater than the predetermined value in step S27 (i.e., NO), the CPU 53 returns to the processing of step S20 without the initial fuel injection being performed.

Namely, in a low-speed startup operation such as a miskick, if the inter-crank signal time is greater than a predetermined value, then the engine speed is not able to reach or exceed the compression top dead center. Consequently, the initial fuel injection is forbidden and any deterioration in startability is prevented.

As described above, in the case of engine non-synchronized initial fuel injection processing, the difference between the initial intake pressure and the current intake pressure (namely, the intake pressure change) is determined at a predetermined cycle and a determination is made as to whether or not the engine 1 is on an intake stroke. In contrast, engine-synchronized initial fuel injection processing differs from this in that the difference between the initial intake pressure and the current intake pressure is determined each time a waveform-shaped crank signal is input (i.e., each time the crankshaft 13 rotates 20°), and a determination is then made as to whether or not the engine 1 is on an intake stroke.

Furthermore, in the case of engine-synchronized initial fuel injection processing, in step S27, by using the inter-crank signal time at the final timing where the fuel injection required for startup can be made in order to determine whether or not the engine speed is able to reach or exceed the compression top dead center and then perform the initial fuel injection, it is possible to prevent excessive fuel being injected in a startup commencement crank angle detection operation or in a low-speed startup operation (for example, a miskick).

Figure 8:
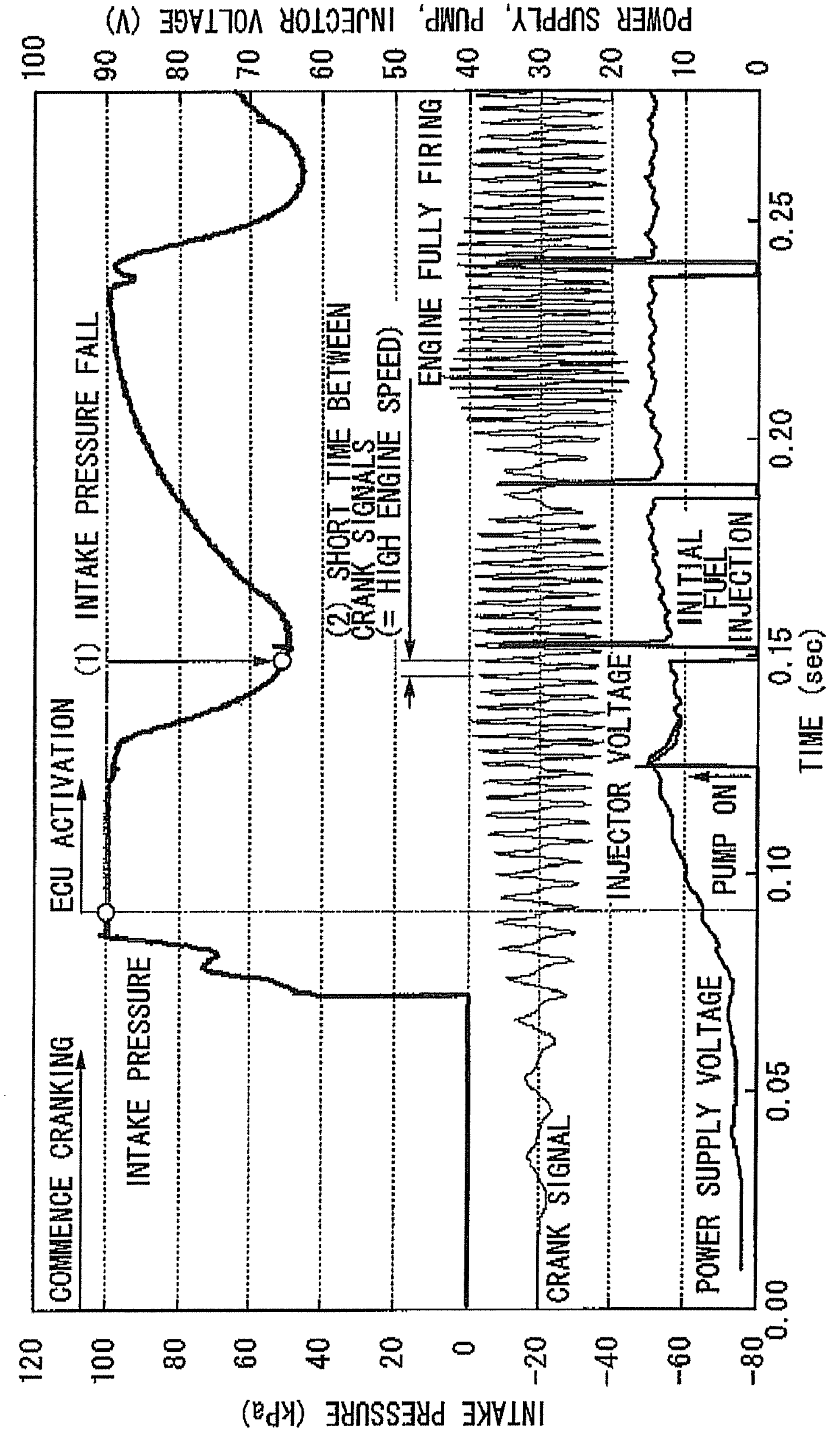
FIG. 8 shows first experimental data when the fuel injection control apparatus (ECU 4) according to an embodiment of the invention is employed.
Figure 9:
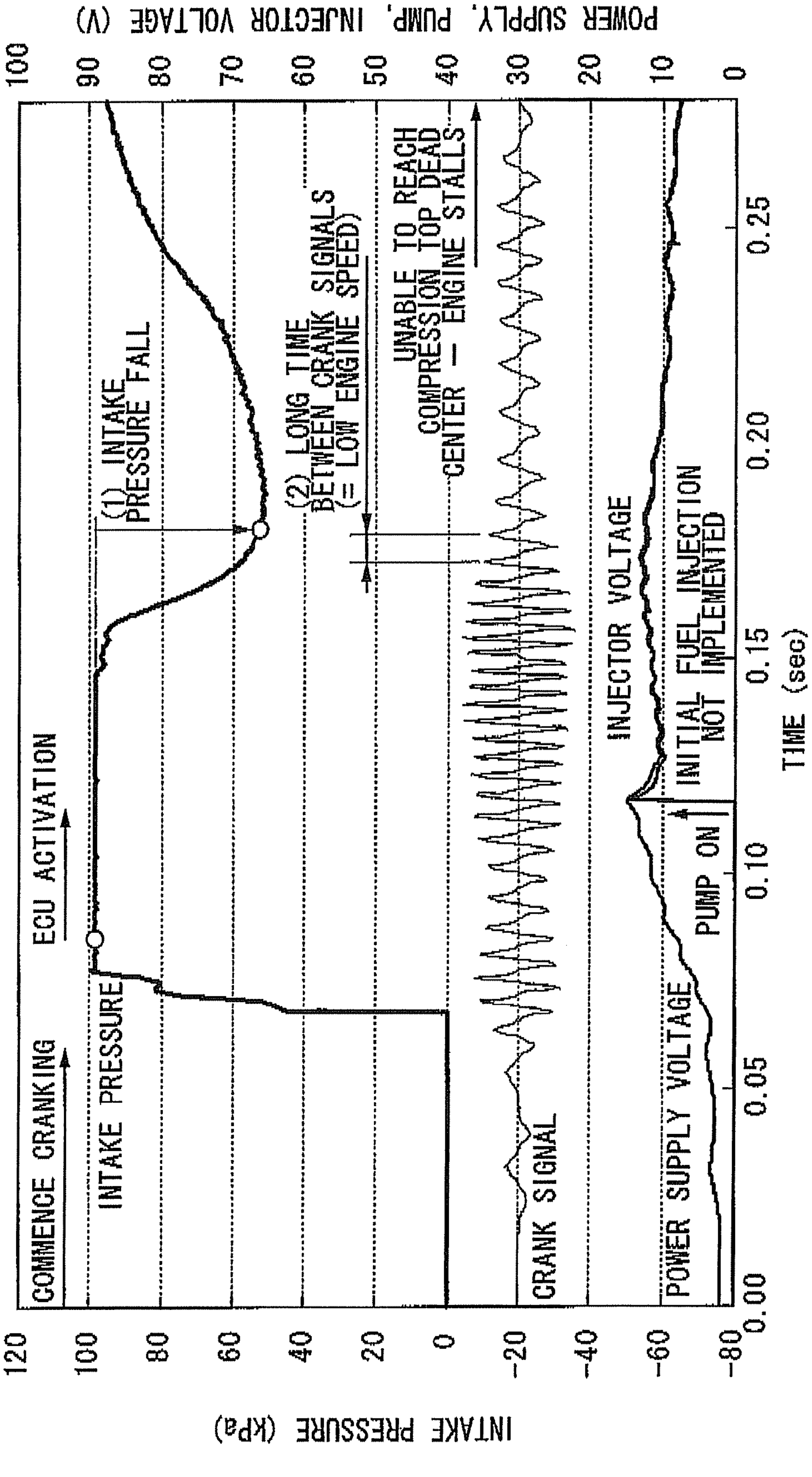
FIG. 9 shows second experimental data when the fuel injection control apparatus (ECU 4) according to an embodiment of the invention is employed.

FIGS. 8 and 9 show experimental data obtained when the engine-synchronized initial fuel injection processing shown in FIG. 7 is performed. FIG. 8 shows the experimental data when a normal kickstart operation is performed. FIG. 9 shows the experimental data when a low-speed startup operation caused by a miskick is performed.

As shown in FIG. 8, it is possible to see when a kickstart operation is performed normally, namely, when the inter-crank signal time is less than a predetermined value and the engine speed is able to reach and exceed the compression top dead center, then the initial fuel injection is performed after approximately 0.15 seconds after the commencement of the startup operation, and the engine is placed in a fully firing state.

In contrast, as shown in FIG. 9, when a low-speed startup operation occurs due to a miskick, namely, when the inter-crank signal time is greater than a predetermined value, and the engine speed is not able to reach and exceed the compression top dead center (in which case the engine stalls), then the initial fuel injection is not made and it is possible to prevent excessive fuel being injected.

The embodiment is not limited to the above-described embodiment and, for example, the variant examples given below may also be considered.

(1) In the above-described embodiment, the intake pressure is used as an intake state value in order to show the intake state of the engine 1, however, the invention is not limited to this and it is also possible to use, for example, the intake rate.

Figure 10:
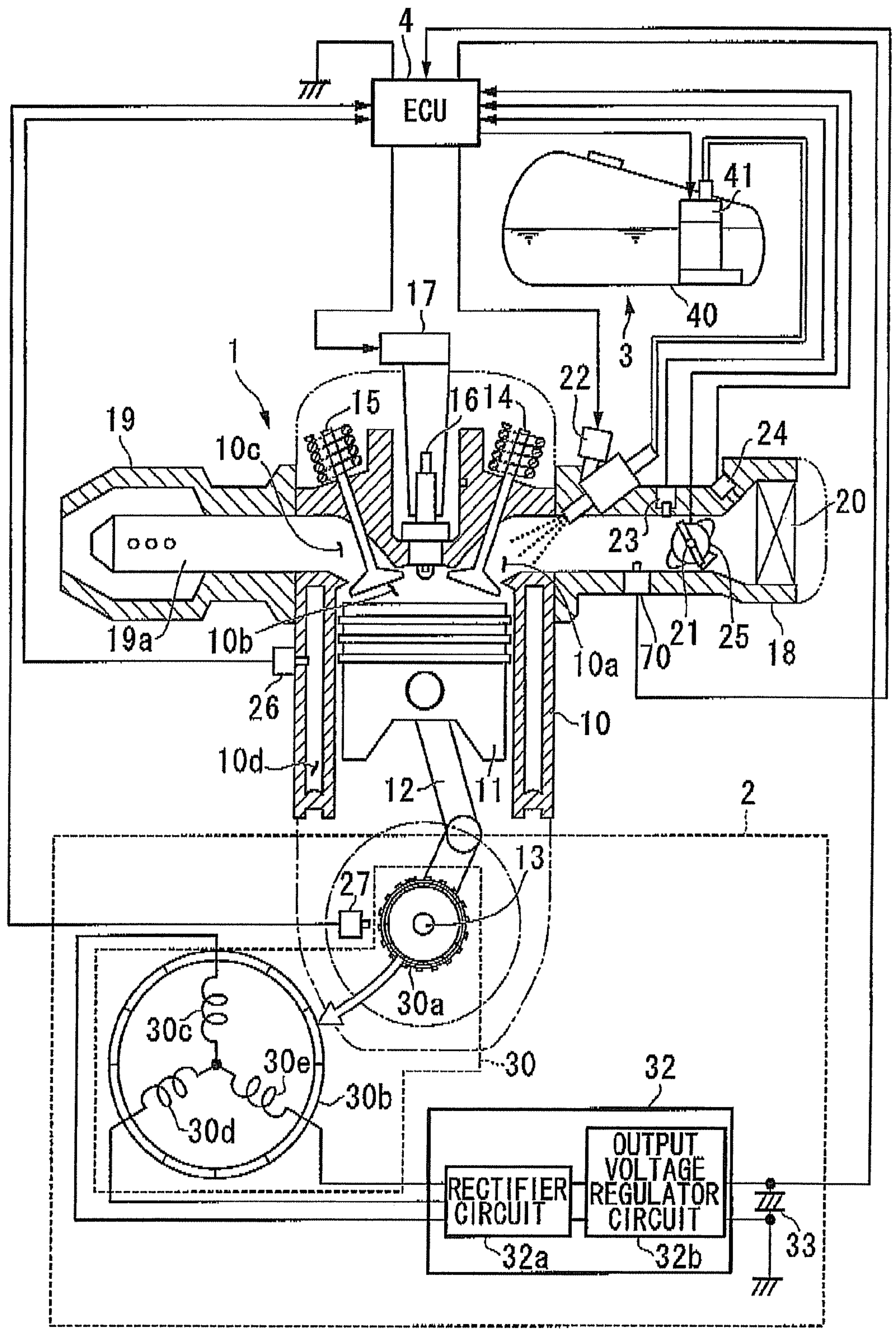
FIG. 10 is a drawing showing an installation position of an airflow sensor 70 when air intake quantity is used instead of air intake pressure as an air intake state value in the fuel injection control apparatus (ECU 4) according to an embodiment of the invention.

Specifically, as shown in FIG. 10, an airflow sensor 70 that outputs an intake rate signal (intake quantity signal) that corresponds to the intake rate (intake quantity) inside the intake pipe 18 is provided in the intake pipe 18 on the downstream side of the throttle valve 21.

Intake rate signals that are output from the airflow sensor 70 are input into the A/D converter 52 of the ECU 4, and digital intake quantity signals that have been digitally converted by the A/D converter 52 are input into the CPU 53.

In this manner, in order to improve the intake rate detection accuracy, it is preferable that the airflow sensor 70 be provided on the downstream side of the throttle valve 21, however, because the airflow sensor 70 becomes dirty easily at this position, the airflow sensor 70 may also be provided on the upstream side of the throttle valve 21.

Figure 11:
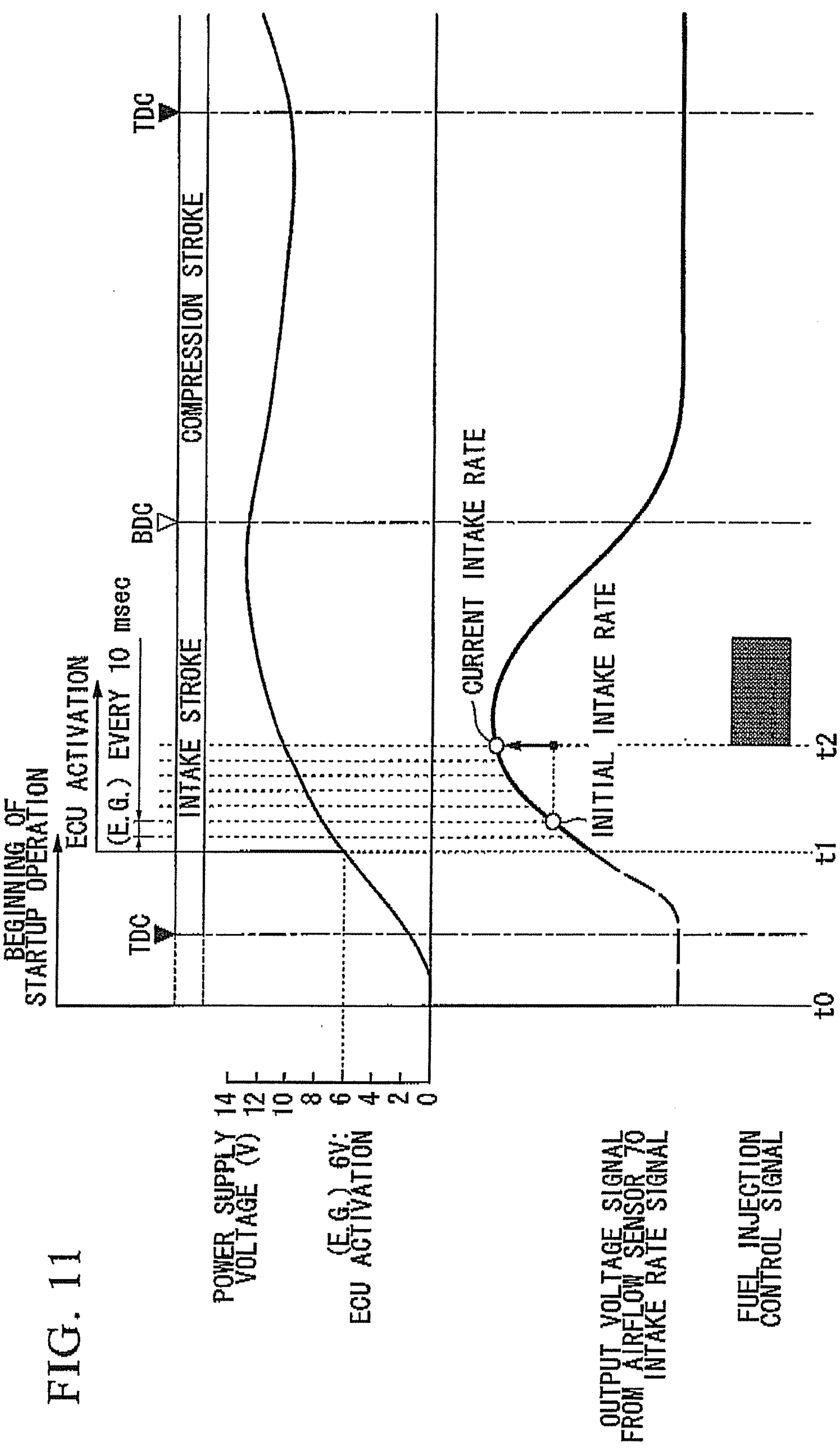
FIG. 11 is a timing chart showing a mutual relationship between power supply voltage and intake quantity signals.

FIG. 11 is a timing chart showing a mutual relationship between the power supply voltage that is supplied to the ECU 4 from the power supply unit 2 and the intake quantity signals that are output from the airflow sensor 70.

As shown in FIG. 11, because the intake quantity signals differ from the intake pressure signals solely in that their polarity is inverted, by using the intake rate instead of the intake pressure in the operation flowcharts shown in FIG. 5 and FIG. 7, it is possible to determine whether or not the engine 1 is on the intake stroke.

(2) In the above-described embodiment, in step S25 of the engine-synchronized initial fuel injection processing, the CPU 53 determines whether or not the engine 1 is on the intake stroke by finding the difference between the initial intake pressure and the current intake pressure each time a waveform-shaped crank signal is input. In step S27, the CPU 53 determines whether or not the engine speed is able to reach and exceed the compression top dead center by using the inter-crank signal time. However, the invention is not limited to this and it is also possible to omit the processing of steps 26 and 27, and when the determination in step S25 is YES, to simply perform the processing of steps S28 and thereafter (in this case, it is not necessary to measure the inter-crank signal time).

By employing this means as well, it is possible to prevent fuel injection during an operation to detect the startup commencement crank angle when an engine is being started up, and to prevent any deterioration in startability during a startup operation.

(3) In the above-described embodiment a description is given using a batteryless engine system as an example. However, the invention is not limited to this and can also be applied to a self-starter type of engine control system that is provided with a battery.

While preferred embodiments of the invention have been described and illustrated above, these are exemplary of the invention and are not to be considered as limiting. Additions, omissions, substitutions, and other modifications can be made without departing from the spirit or scope of the invention. Accordingly, the invention is not to be considered as limited by the foregoing description and is only limited by the scope of the appended claims.

What is claimed is:

1. A fuel injection control apparatus comprising:

an internal combustion engine;

a fuel injection unit provided in the internal combustion engine;

an intake state detection unit that detects an intake state value indicating an intake state of the internal combustion engine, and that outputs an intake state signal;

a control unit to which the intake state signal is input, that determines based on the intake state signal whether or not the internal combustion engine is on an intake stroke, and that controls the fuel injection unit so that an initial fuel injection is performed in order to start up the engine when the control unit determines that the engine is on an intake stroke, wherein:

an intake pressure signal corresponding to the intake pressure inside an intake pipe of the internal combustion engine or an intake rate signal corresponding to the intake rate inside the intake pipe is used as the intake state signal; and after the control unit has been activated, the control unit controls the fuel injection unit so as to perform the initial fuel injection when a difference between an initial intake state value that is calculated based on the intake state signal and a current intake state value that is calculated at a predetermined cycle is equal to or greater than a predetermined value.

2. The fuel injection control apparatus according to claim 1, further comprising:

an A/D converter to which the intake state signal is input, that converts the intake state signal into a digital signal, and that outputs the intake state signal that has been converted into the digital signal as a digital intake state signal;

a time measurement unit;

a storage unit; and a fuel injection drive unit that outputs to the fuel injection unit a drive signal in order to drive the fuel injection unit in accordance with a fuel injection control signal that is output from the control unit, wherein after the control unit has been activated, the control unit stores in the storage unit the initial intake state value which was calculated based on the digital intake state signal, controls the time measurement unit so as to measure the predetermined cycle, calculates the current intake state value based on the digital intake state signal each time the predetermined cycle passes, and outputs the fuel injection control signal in order to control the fuel injection unit so as to perform the initial fuel injection when the difference between the initial intake state value and the current intake state value is equal to or greater than a predetermined value.

3. The fuel injection control apparatus according to claim 1, further comprising:

a crank angle detection unit that is provided in the internal combustion engine, and that outputs a crank signal each time a crankshaft rotates by a predetermined angle in synchronization with a rotation of the crankshaft, wherein the crank signal and the intake state signal are input to the control unit, after the control unit has been activated, the control unit calculates the intake state value each time the crank signal is detected based on the crank signal and the intake state signal, and controls the fuel injection unit so as to perform the initial fuel injection when the difference between the intake state value when the initial crank signal was detected and the intake state value when the current crank signal was detected is equal to or greater than a predetermined value.

4. The fuel injection control apparatus according to claim 3, further comprising:

an A/D converter to which the intake state signal is input, that converts the intake state signal into a digital signal, and that outputs the intake state signal that has been converted into the digital signal as a digital intake state signal;

a waveform shaping unit to which the intake state signal is input, that performs waveform shaping so that the crank signals are formed into pulse signals formed in a square-wave form, and the cycle of the pulse signals being the time required for the rotation of the predetermined angle;

a storage unit; and a fuel injection drive unit that outputs to the fuel injection unit a drive signal in order to drive the fuel injection unit in accordance with a fuel injection control signal that is output from the control unit, wherein after the control unit has been activated, the control unit calculates the intake state value each time the pulse signal is detected based on the pulse signal and the digital intake state signal, stores in the storage unit the intake state value when the initial pulse signal was detected, and outputs the fuel injection control signal in order to control the fuel injection unit so as to perform the initial fuel injection when the difference between the intake state value when the initial pulse signal was detected and the intake state value when the current pulse signal was detected is equal to or greater than a predetermined value.

5. The fuel injection control apparatus according to claim 1, further comprising:

a crank angle detection unit that is provided in the internal combustion engine, and that outputs a crank signal each time a crankshaft rotates by a predetermined angle in synchronization with a rotation of the crankshaft, wherein the crank signal and the intake state signal are input to the control unit, after the control unit has been activated, the control unit calculates the intake state value when a crank signal is detected based on the crank signal and the intake state signal, and controls the fuel injection unit so as to perform the initial fuel injection when the difference between the intake state value when the initial crank signal was detected and the intake state value when the current crank signal was detected is equal to or greater than a predetermined value and when an inter-crank signal time between the previous crank signal detection and the current crank signal detection is equal to or less than a predetermined value.

6. The fuel injection control apparatus according to claim 5, further comprising:

an A/D converter to which the intake state signal is input, that converts the intake state signal into a digital signal, and that outputs the intake state signal that has been converted into the digital signal as a digital intake state signal;

a waveform shaping unit to which the intake state signal is input, that performs waveform shaping so that the crank signals are formed into pulse signals formed in a square-wave form, and the cycle of the pulse signals being the time required for the rotation of the predetermined angle;

a time measurement unit;

a storage unit; and a fuel injection drive unit that outputs to the fuel injection unit a drive signal in order to drive the fuel injection unit in accordance with a fuel injection control signal that is output from the control unit, wherein after the control unit has been activated, the control unit calculates the intake state value each time the pulse signal is detected based on the pulse signal and the digital intake state signal, controls the time measurement unit so as to measure the time between the detection of the previous pulse signal and the detection of the current pulse signal, stores in the storage unit the intake state value when the initial pulse signal was detected, and outputs the fuel injection control signal in order to control the fuel injection unit so as to perform the initial fuel injection when the difference between the intake state value when the initial pulse signal was detected and the intake state value when the current pulse signal was detected is equal to or greater than a predetermined value and when inter-crank signal time between the previous pulse signal detection and the current pulse signal detection is equal to or less than a predetermined value.

7. The fuel injection control apparatus according to claim 5, wherein when the inter-crank signal time is greater than a predetermined value, the control unit does not perform the initial fuel injection.

8. The fuel injection control apparatus according to claim 1, wherein the control unit controls the fuel injection unit so as to perform the initial fuel injection when the difference between the initial intake state value and the current intake state value is equal to or greater than 10 kPa.

* * * * *